_UNITED STATES PATENT OFFICE._

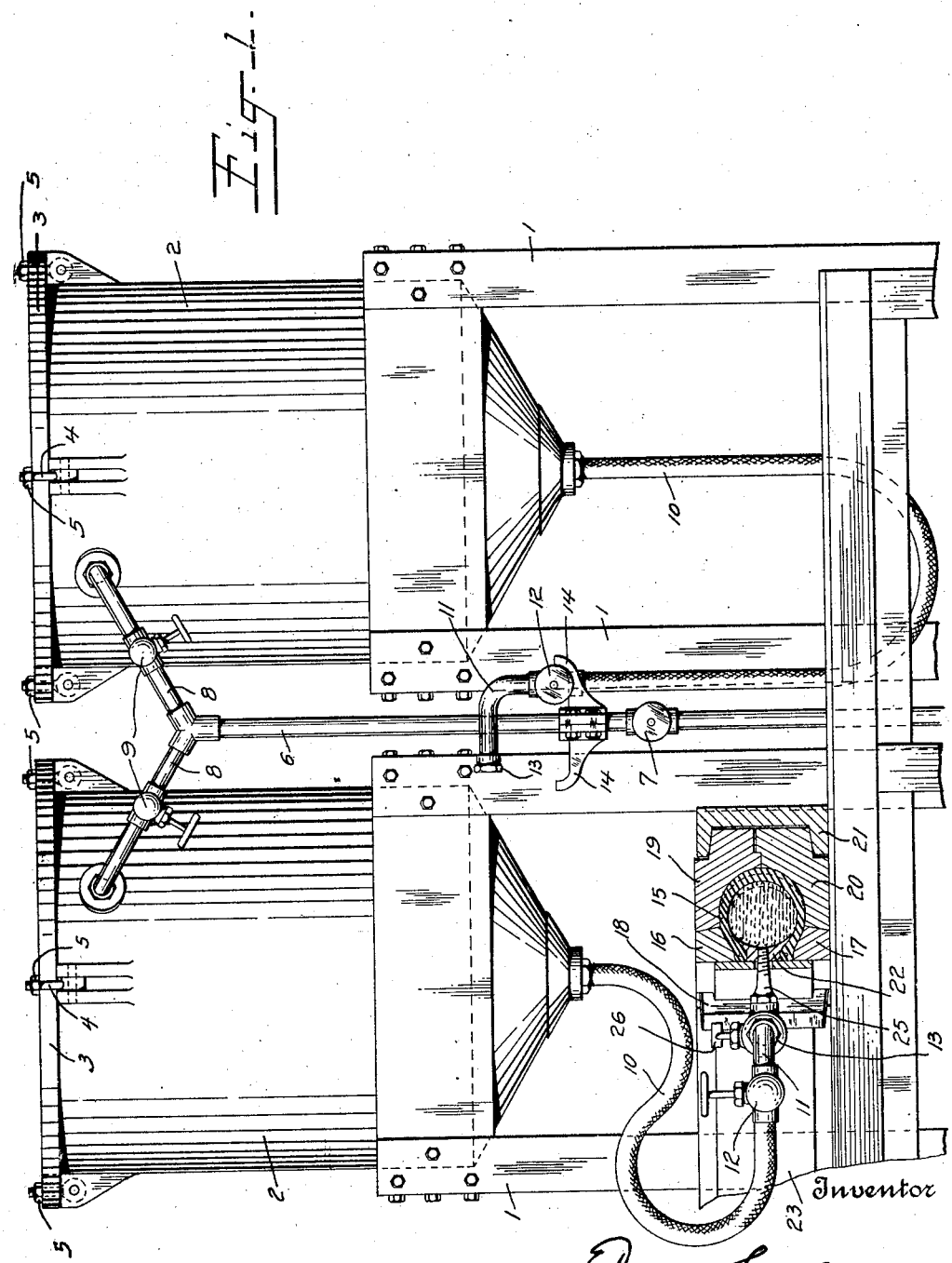

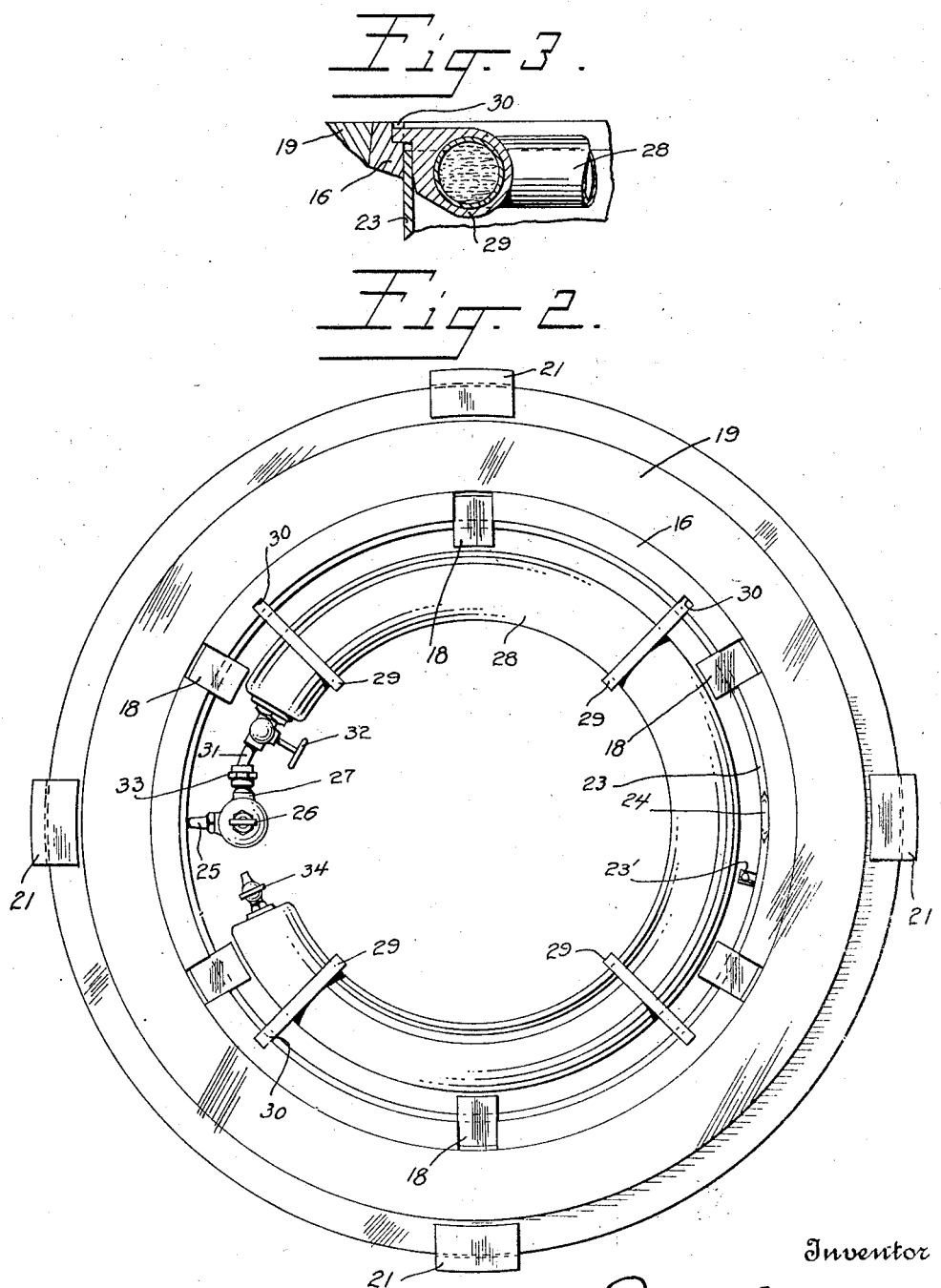

ERNEST HOPKINSON, OF NEW YORK, N. Y.

APPARATUS FOR MAKING PNEUMATIC-TIRE CASINGS.

1,349,424.  Specification of Letters Patent.  Patented Aug. 10, 1920.

Application filed October 25, 1919. Serial No. 333,426.

*To all whom it may concern:*

Be it known that I, ERNEST HOPKINSON, a citizen of the United States, residing at New York city, county of New York, and State of New York, have invented certain new and useful Improvements in Apparatus for Making Pneumatic-Tire Casings, of which the following is a full, clear, and exact description.

This invention relates to an apparatus for making pneumatic tire casings, and more particularly to an apparatus for carrying out the method set forth in my prior application Serial No. 303,136 filed June 10, 1919.

Previously tires have been vulcanized on solid cores, but this method is objectionable owing to the limited life of the cores. Moreover, in the ordinary method of building the casings the mesh or weave of the fabric is opened or stretched in the tread portions and closed or condensed at the free edges, and when vulcanized under pressure in this condition on a core different portions of the finished tire are not equally capable of withstanding the strains encountered during use. To avoid this the tires have been stretched and cured on air bags, or a gaseous fluid or a liquid under pressure has been introduced directly into the casing during vulcanization. The air bags are expensive and short lived and if a liquid or gaseous fluid be placed directly in a tire casing it requires a special method of manufacture to prevent the fluid from permeating the wall structure of the tire and rendering the latter porous. In addition, if the stretching operation is performed while using a liquid or gaseous filler in the casing the fibers tend to straighten out in a chord and become inwardly displaced from their proper curved position in the tire body, since the liquid or gaseous filler offers no appreciable resistance to this displacement. By my method above referred to a plastic under pressure and containing just enough liquid to give it the desired fluidity is used to fill the tire casing, and the latter then vulcanized while the plastic is maintained under a balanced pressure. This causes a stretching and rearrangement of the fabric threads to properly tension them before vulcanization, the tire body is compacted and there is no tendency of the plastic to permeate the tire. The plastic is somewhat yielding, and therefore when outer rigid molds are used it does not subject the fabric and body of the casing to the crushing action exerted by a rigid metal core when a casing is pressed between such a core and outer rigid mold walls. At the same time due to the semi-solid nature of the plastic and the pressure employed the tire is compacted and stretched as above stated, the size and shape of the mold cavity are accurately reproduced, and the semi-solid filler offers enough resistance to prevent the above mentioned objectionable straightening and inward displacement of the fibers relatively to the tire body.

An object of the present invention is to provide a suitable apparatus for carrying out my above mentioned method.

Another object is to provide for an individual control of the pressure on the plastic in each tire during vulcanization.

A further object is to provide an individual plastic reservoir for each mold, supported by and movable as a unit with the mold, but at the same time readily removable therefrom.

In the drawings:

Figure 1 is a side elevation showing the main plastic reservoirs for filling the tire casing, and showing a mold partly in section having a tire casing therein connected to one of the reservoirs.

Fig. 2 is a top plan view of a tire mold with an individual plastic reservoir supported therein.

Fig. 3 is a broken section showing the manner of supporting the plastic reservoir on the mold.

Referring to the drawings the numeral 1 is applied to a support upon which is mounted a reservoir 2 for the plastic. A top 3 for the reservoir is held in place by the pivot bolts 4 and nuts 5. Any desired number of reservoirs 2 may be used, and in the present instance they are mounted in pairs. A compressed air supply pipe 6 with a valve 7 therein is provided with branches 8 leading into the upper portions of the tanks 2, valves 9 being disposed in the branches 8. A flexible hose 10 is connected to the bottom of each tank, the free end of the hose being provided with a metal elbow 11 provided with a valve 12 and coupling 13. Secured to the compressed air supply pipe 6 are brackets 14 upon which the hose sections 10 may be supported by their valves 12 when not in use. The tire casings may if desired be filled with plastic before being placed in the molds, but as the plastic is supplied under pressure it is necessary to confine the edges of the casing against movement, and it is therefore preferable to fill the casings after their walls are substantially in their normal position and confined against outward movement. In Fig. 1 a tire casing 15 is shown inclosed in a mold having sections 16 and 17 secured by clamps 18 and sections 19 and 20 secured by clamps 21. A two-part bull ring formed by the rings 22 and 23 acts as a closure for the casing. The outer ring 23 is split and a wedge-shaped key 24 is used to expand the ring 23 against the mold sections 16 and 17 and the ring 22. A pipe 25 is threaded through the ring 22 and communicates with the interior of the tire casing when in position. In the pipe 25 is a valve 26 having a pipe nipple 27 leading therefrom. Disposed within the inner periphery of the annular tire mold is a segmental ring-shaped auxiliary plastic reservoir 28. Surrounding said reservoir at intervals are brackets 29, extensions of which are adapted to rest in the recesses 30 formed in the mold sections 16. Leading from one end of the reservoir 28 is a pipe nipple 31 having a valve 32 therein and a coupling 33 at its end. A clean-out and pressure relief valve 34 leads from the other end of the reservoir 28.

In operation, a tire casing having been placed in the mold as shown in Fig. 1, the coupling 13 of the hose 10 is connected to the nipple 27 and the valves 12 and 26 opened, and the casing filled with plastic under controlled pressure from the reservoir 2. During the filling operation the air may be removed from the casing in any desired manner as by exhausting it through the valve 23' in the bull ring. The pressure of the plastic results in compacting the tire casing against the mold walls, and where the casing is of smaller size than the cavity in the mold, as shown in dotted lines in Fig. 1, it further results in a stretching of the casing to its final size and pressing it against the mold walls, thereby properly tensioning the threads of the fabric. The entire forming operation may be completed at this time if desired, including the formation of the tread and any surface configurations thereon. I prefer, however, after the stretching operation has been substantially completed, to close the valve 26, disconnect the hose 10 therefrom, and to connect the nipple 31 of the auxiliary plastic reservoir 28 to the nipple 27 by the coupling 33. This auxiliary reservoir has been previously partly filled with plastic under a predetermined pressure by forcing the plastic thereinto through the nipple 31 until the air in the reservoir has been compressed to the required degree. The relative quantities of plastic and air in the reservoir may be adjusted by use of the pressure relief valve 34 during the filling operation. Upon connection of the auxiliary reservoir with the nipple 27 the valves 32 and 26 are opened, thus placing the plastic in the tire casing under a predetermined and balanced pressure. The mold with its accompanying auxiliary plastic reservoir 28 is then placed in the vulcanizer, and any further stretching or reshaping of the casing during vulcanization requiring a change in the pressure of the plastic or the quantity required to fill the casing is taken care of by the auxiliary reservoir 28 with its air cushion. It is very desirable that the pressure in each tire casing being vulcanized be individually controlled in order that a leak or other defect occurring in the means for producing pressure may not affect the whole batch of tires in the vulcanizer and ruin them. By mounting individual auxiliary reservoirs within each mold as indicated in Fig. 2 this result is obtained while at the same time each auxiliary reservoir is movable as a unit with its mold and yet readily removable therefrom.

Having thus described my invention, what I claim as new and desire to protect by Letters Patent is:

1. In an apparatus for forming and vulcanizing tire casings, means for closing a tire casing adjacent its rim-engaging portions, means whereby the casing may be filled with plastic under pressure, and an individual source of plastic under predetermined pressure disposed adjacent to and adapted to be connected with the casing during vulcanization.

2. In an apparatus for forming and vulcanizing tire casings, means for closing a tire casing adjacent its rim-engaging portions, a mold surrounding the outer walls of the casing, means whereby the casing may be filled with plastic under pressure, and an individual source of plastic under pressure carried by the mold and adapted to be connected with the casing after it is filled and remain in communication therewith during vulcanization.

3. In an apparatus for forming and vulcanizing tire casings, means for closing a tire casing adjacent its rim-engaging portions, a mold surrounding the casing, means whereby the casing may be filled with plastic and an individual auxiliary plastic reservoir maintained under predetermined pressure and adapted to be placed in communication with the casing during vulcanization, said reservoir being disposed within the periphery of the mold and supported thereon.

4. In an apparatus for forming and vulcanizing tire casings, an annular tire mold, recesses on the inner periphery thereof, a segmental plastic reservoir disposed within the inner periphery of the mold and having brackets adapted to rest in said recesses, and means for placing said reservoir in communication with the interior of a tire in said mold.

Signed at New York, county of New York, and State of New York, this 24th day of October, 1919.

ERNEST HOPKINSON.